United States Patent
Kamiyama et al.

(10) Patent No.: US 6,296,729 B1
(45) Date of Patent: Oct. 2, 2001

(54) METHOD OF MANUFACTURING PIPE LINER BAG

(75) Inventors: Takao Kamiyama, Hiratsuka; Yasuhiro Yokoshima; Shigeru Endoh, both of Ibaraki-ken; Hiroyuki Aoki, Tokorozawa, all of (JP)

(73) Assignees: Shonan Gosei-Jushi Seisakusho K.K., Hiratsuka; Yokoshima & Company, Ibaraki-ken; GET Inc., Tsukuba; OAR Company, Tokorozawa, all of (JP)

( * ) Notice: Subject to any disclaimer, the term of this patent is extended or adjusted under 35 U.S.C. 154(b) by 0 days.

(21) Appl. No.: 09/399,205

(22) Filed: Sep. 17, 1999

(30) Foreign Application Priority Data

Sep. 25, 1998 (JP) ................................................. 10-272177

(51) Int. Cl.[7] .............................. B29C 53/38; B32B 7/08
(52) U.S. Cl. ........................ 156/93; 156/218; 156/294; 156/304.3; 138/98
(58) Field of Search ....................... 138/97, 98; 156/287, 156/294, 93, 218, 304.3, 308.4; 264/269; 428/60, 61

(56) References Cited

U.S. PATENT DOCUMENTS

| | | |
|---|---|---|
| 4,446,181 * | 5/1984 | Wood ...................................... 428/36 |
| 5,329,063 | 7/1994 | Endoh . |
| 5,698,056 * | 12/1997 | Kamiyama et al. .................. 156/218 |
| 5,765,597 | 6/1998 | Kiest, Jr. et al. . |
| 5,885,674 * | 3/1999 | Maemoto et al. ................... 428/36.1 |
| 6,042,668 * | 3/2000 | Kamiyama et al. .................... 156/93 |

* cited by examiner

Primary Examiner—Michael W. Ball
Assistant Examiner—Todd J. Kilkenny
(74) Attorney, Agent, or Firm—Knobbe, Martens, Olson & Bear, LLP

(57) ABSTRACT

A method of manufacturing a pipe liner bag is provided for reliably sealing a seam of a resin absorbent material with simple operations without forming pin holes through the resin absorbent material. The pipe liner bag comprises a tubular resin absorbent material having an outer surface covered with a highly air-tight plastic film and a hardenable resin impregnated in the tubular resin absorbent material. A plastic film is welded on a surface of a strip-like resin absorbent material. The plastic film has a width smaller than the resin absorbent material which has sewing margins in both end portions in a width direction. The resin absorbent material is folded such that the plastic film is exposed. Both edges of the resin absorbent material in the width direction are laid one on top of the other. The overlapping portions of the resin absorbent material is lock sewed to form a tubular resin absorbent material. A seam protection tape is welded or adhered to the sewing margin including a seam of the resin absorbent material. A sealing ribbon tape having a width larger than the seam protection tape is welded or adhered over the seam protection tape to air-tight seal the seam.

8 Claims, 6 Drawing Sheets

METHOD OF MANUFACTURING PIPE LINER BAG

BACKGROUND OF THE INVENTION

1. Field of the Invention

The present invention relates to a method of manufacturing a pipe liner bag for use in repair of an old pipe.

2. Description of the Related Art

When an underground pipe, such as pipelines and passageways, becomes defective or too old to perform properly, the pipe is repaired and rehabilitated without digging the earth to expose the pipe and disassembling the sections of the pipe. This non-digging method of repairing an underground pipe has been known and practiced commonly in the field of civil engineering. The pipe lining method utilizes a tubular pipe liner bag made of a resin absorbent material impregnated with a hardenable resin, and having the outer surface covered with a highly air-tight plastic film. The tubular pipe liner bag is inserted into a pipe to be repaired by means of a pressurized fluid such that the pipe liner bag is turned inside out as it proceeds deeper in the pipe. Hereinafter, this manner of insertion shall be called "everting." When the entire length of the tubular liner bag is everted (i.e., turned inside out) into the pipe, the everted tubular liner is pressed against the inner wall of the pipe by a pressurized fluid, and the tubular flexible liner is hardened as the hardenable resin impregnated in the liner is heated, which is effected by heating the fluid filling the tubular liner bag. It is thus possible to line the inner wall of the defective or old pipe with a rigid liner without digging the ground and disassembling the pipe sections.

The pipe lining material for use in the foregoing pipe lining method may be manufactured by a method proposed, for example, in Japanese Patent Publication No. 58-33098 (corresponding PCT Patent Publication No. WO80-00720). Specifically, this method involves joining, by sewing, both sides of a strip laminate having a resin absorbent material and an opaque layer made of a plastic film or the like overlaid on one surface of the resin absorbent material, and adhering a sealing ribbon tape or the like to the joined portion of the strip to form a tubular pipe liner bag.

This manufacturing method employs lock sewing for the sewing of the resin absorbent material, so that a sewing yarn appears in a portion of the resin absorbent material sewed by the lock sewing on both sides of the seam over a constant width. Then, the sealing ribbon tape is adhered or welded on the opaque layer near the joined surface to seal the seam. In this event, the sealing ribbon tape is pressed onto the opaque layer from above the sewing yarn to adhere or weld the sealing ribbon tape to the opaque layer.

However, since the sewing yarn appears on the surface of the opaque layer, the sealing ribbon tape covered over the appearing sewing yarn and pressed onto the opaque layer for adhesion or welding will result in the sewing yarn cutting into the sealing ribbon tape, causing pin holes formed through the sealing ribbon tape.

Also, even if the sealing ribbon tape is adhered to the opaque layer with an adhesive, the difference in material between the sewing yarn and the opaque layer prevents the sealing ribbon tape, although adhering to the opaque layer, from adhering to the sewing yarn. For this reason, a sealing ribbon tape having a width larger than the sewing width of the resin absorbent material must be used to adhere to the opaque layer beyond the seam.

The above-mentioned sealing method, however, is highly susceptible to formation of pinholes, and also involves complicated works.

SUMMARY OF THE INVENTION

The present invention has been made in view of the problems mentioned above, and it is an object of the invention to provide a method of manufacturing a pipe liner bag which is capable of reliably sealing a seam with simple operations without forming pin holes.

The present invention is adapted to be embodied in a method of manufacturing a pipe liner bag. The pipe liner bag comprises a tubular resin absorbent material having an outer surface covered with a highly air-tight plastic film and a hardenable resin impregnated in the tubular resin absorbent material.

In accordance with one aspect of the present invention, the method comprises the step of affixing a plastic film on a surface of a strip resin absorbent material, wherein the plastic film has a width smaller than the resin absorbent material to form sewing margins in both end portions in a width direction. The method also comprises the step of folding the resin absorbent material with the plastic film being exposed, and laying the sewing margins of the resin absorbent material on top of each other. The method further comprises the step of lock sewing the overlapping sewing margines of the resin absorbent material to form a tubular resin absorbent material. The method still further comprises the step of affixing a seam protection tape to the sewing margin including a seam of the resin absorbent material. The method yet further comprises the step of affixing a sealing ribbon tape having a width larger than the seam protection tape over the seam protection tape to air-tight seal the seam.

Further aspects, features and advantages of the present invention will become apparent from the detailed description of the preferred embodiments which follow.

BRIEF DESCRIPTION OF THE DRAWINGS

Generally.

FIG. 1 is a partial cross-sectional view illustrating a step in a method of manufacturing a pipe liner bag according to the present invention (needle punching step).

FIG. 2 is a partial cross-sectional view illustrating a step in the method of manufacturing a pipe liner bag according to the present invention (plastic film welding steps FIG. 3 is a partial perspective view illustrating a strip unwoven fabric on which a plastic film is welded.

FIG. 4 is a partial perspective view of a pipe liner bag for illustrating a step in the method of manufacturing a pipe liner bag according to the present invention (sewing step).

FIG. 5 is a partial perspective view of a pipe liner bag for illustrating a step in the method of manufacturing a pipe liner bag according to the present invention (seam protection tape welding step).

FIG. 6 is a partial perspective view illustrating a tubular resin absorbent material having a sealed seam.

FIG. 7 is a partial perspective view of a pipe liner bag for illustrating a step in the method of manufacturing a pipe liner bag according to the present invention (sealing ribbon tape welding step).

DETAILED DESCRIPTION OF THE PREFERRED EMBODIMENTS OF THE INVENTION

The present invention will hereinafter be described in connection with several preferred embodiments thereof with reference to the accompanying drawings.

Referring to FIGS. 1 to 8, a method of manufacturing a pipe liner bag according to the present invention will now be described.

Figure 1:
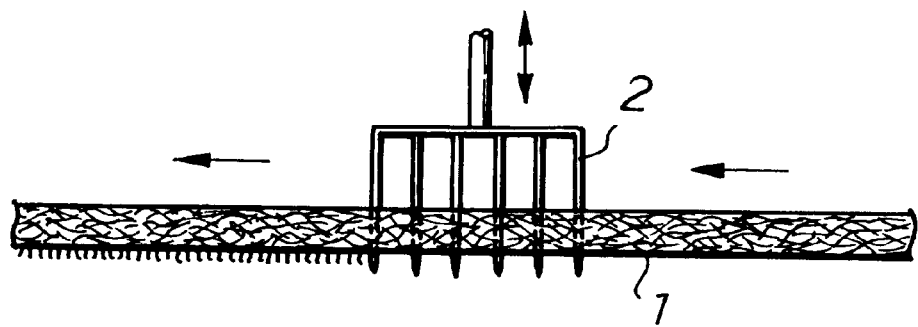
FIGS. 1 to 7 are diagrammatical views illustrating in order various steps in a method of manufacturing a pipe liner bag according to the present invention.

The manufacturing method according to the present invention employs a needle punching for manufacturing a strip resin absorbent material 1, as illustrated in FIG. 1. Specifically, in a needle punching process, several sheets of fibers such as polyester, acrylic, vinylon or the like are stacked. Then the stack is punched with a large number of vertically movable needles while being moved in a direction indicated by arrows in FIG. 1 at a predetermined speed, thereby fabricating a strip-like unwoven fabric with a weight ranging from 500 g/m$^2$ to 1200 g/m$^2$, of which a resin absorbent material 1 is made. To enhance the strength of the resultant resin absorbent material, glass fiber, carbon fiber, Kepler fiber or the like may be mixed in the unwoven fabric.

It has been confirmed that in the needle punching process, needles are drawn out with more difficulties on the opposite side of the unwoven fabric from which the needles 2 project than the upper side of the unwoven fabric into which the needles 2 are penetrated.

Figure 2:
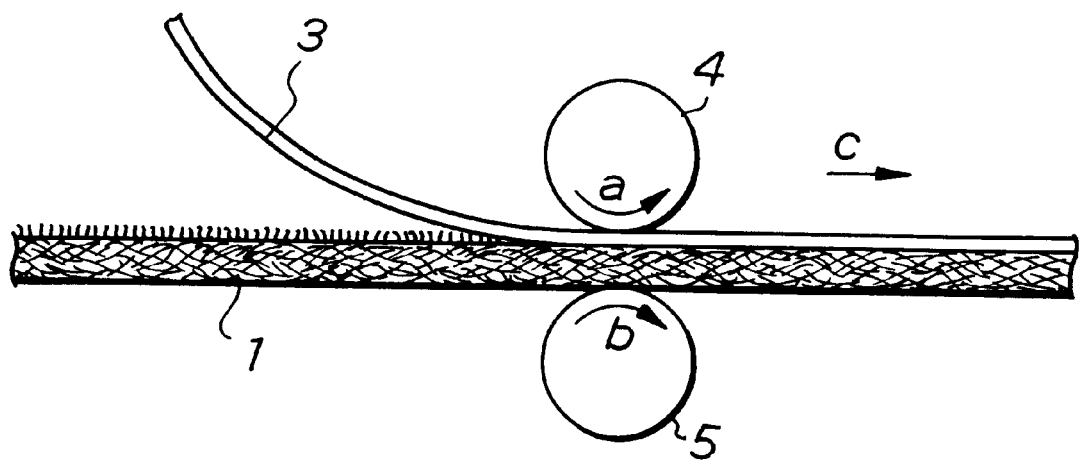

Therefore, in the next step, a highly air-tight plastic film 3 having a width smaller than the resin absorbent material 1 is welded on the side of the strip resin absorbent material (unwoven fabric 1), resulting from the needle punching, from which the needles 2 project (upper side in FIG. 2), as illustrated in FIG. 2.

The plastic film 3 used herein may be made of three kinds of materials and formed in a five-layer or ten-layer laminate. The materials may include a polyurethane, nylon or EVOH which is highly resistant to styrene. The plastic film 3 is placed on the upper surface of the resin absorbent material 1, and passed between a heating roller 4 and a pressure roller 4 together with the resin absorbent material 1. As a result, the plastic film 3 is welded on the upper surface of the resin absorbent material 1 with a sewing margin left on each of both ends in the width direction, as illustrated in FIG. 3.

More specifically, the heating roller 4 has been heated at a predetermined temperature with steam or any other suitable means. The plastic film overlying the resin absorbent material 1 is passed between the heating roller 4 and the pressure roller 5, which are rotating respectively in the directions indicated by arrows a, b in FIG. 2, in the direction indicated by an arrow c to weld the plastic film 3 onto the upper surface of the resin absorbent material 1 (on the surface from which the needles 2 projected in the needle punching process). As illustrated in FIG. 3, sewing margins 1a, which are not welded with the plastic film 3, are left in both end portions in the width direction on the upper surface of the resin absorbent material 1. It should be noted that while in this embodiment, the plastic film 3 is welded onto the upper surface of the resin absorbent material 1, an adhesive may be used alternatively to adhere the plastic film 3 to the resin absorbent material 1.

Figure 3:
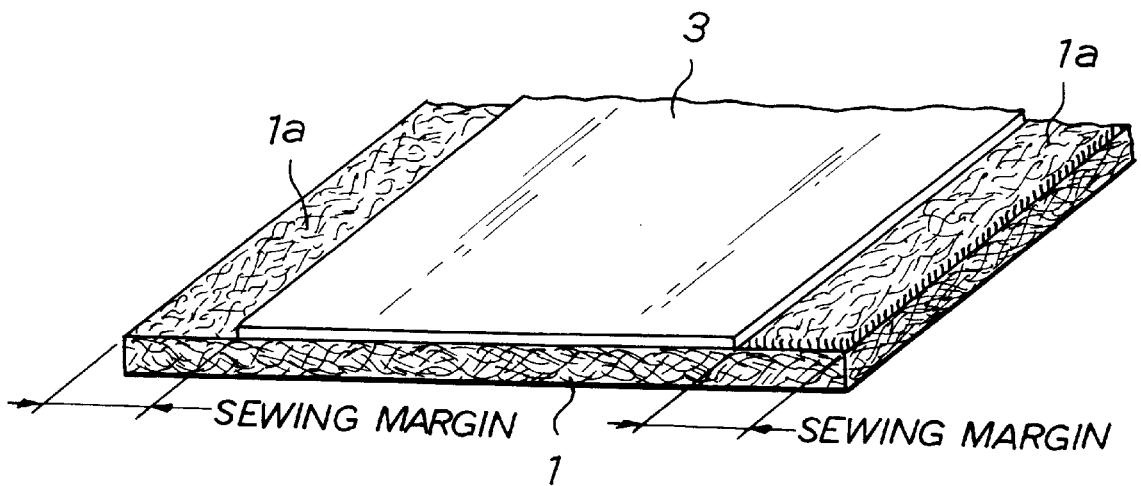
Figure 4:
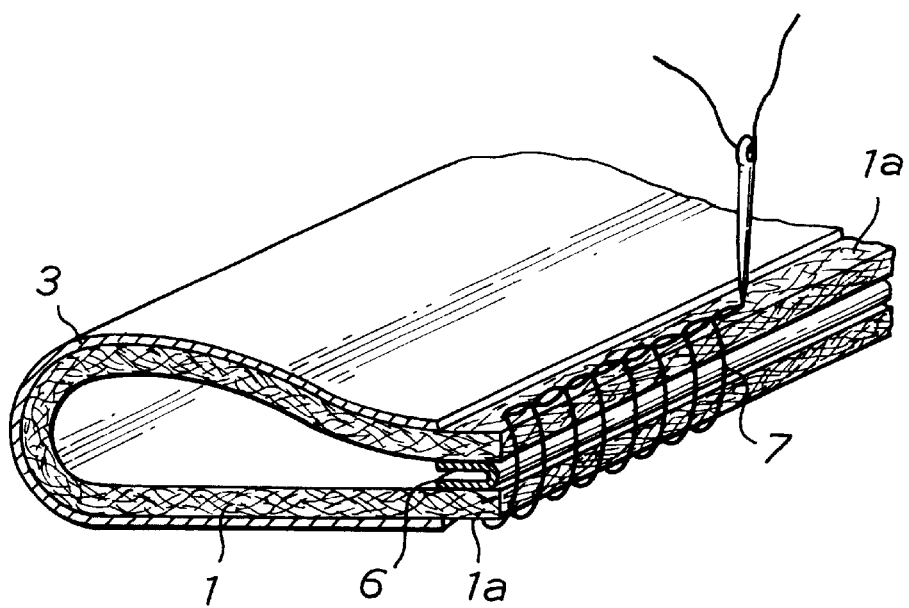

When the plastic film 3 has been eventually welded on the upper surface of the resin absorbent material 1 as illustrated in FIG. 3, the resin absorbent material 1 welded with the plastic film 3 is folded with the plastic film 3 being exposed as illustrated in FIG. 4, and both edges in the width direction are laid one on top of the other. A reinforcing ribbon tape 6, folded in a U-shape, is sandwiched between the overlapping edges, and preliminary welded or adhered thereto. Then, the overlapping edges are joined together with the reinforcing ribbon tape 6 by lock sewing using a sewing yarn 7. The lewing yarn 7 may be made of such a material as nylon, polyester, Kepler or ceramic. The reinforcing ribbon tape 6 is advantageously made of the same material as the resin absorbent material 1.

Figure 5:
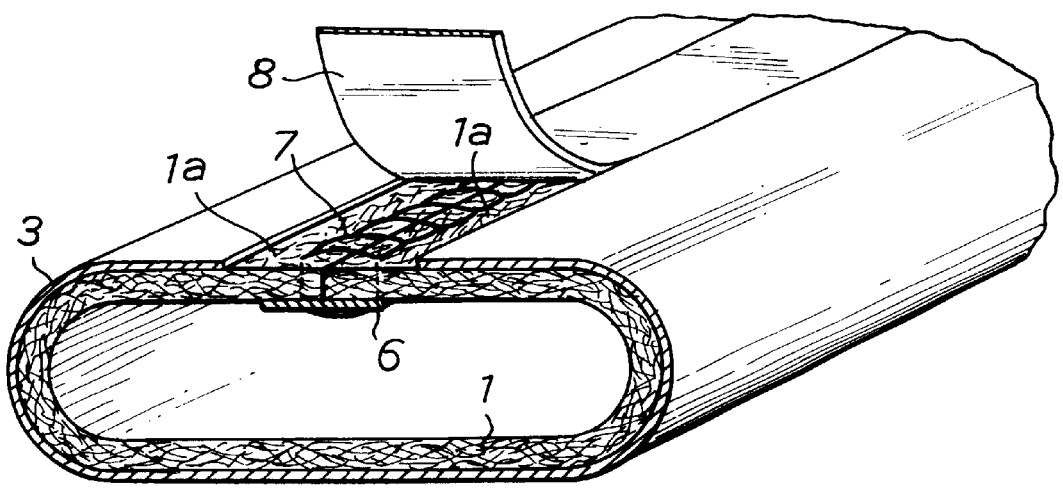

Once the overlapping edges of the resin absorbent material 1 have been joined by lock sewing as described above, the resin absorbent material 1 is pulled to left and right from the joint to abut both the edges, as illustrated in FIG. 5, with the reinforcing ribbon tape 6 acting on the abutting portion for reinforcement.

Subsequently, as illustrated in FIG. 5, a seam protection tape 8 is welded or adhered to the outer surface of the joint (sewing margin 1a) including the seam of the resin absorbent material 1 formed in a tubular shape. Then, a sealing ribbon tape 9 having a width larger than the seam protection tape 8 is welded or adhered from above the seam protection tape 8 over the plastic film 3 beyond both sides of the seam protection tape 8 to provide an air-tight structure for the seam. The seam protection tape 8 is advantageously made of an unwoven fabric with small tensile elongation or an unwoven fabric mixed with fabric. The unwoven fabric may be made of fiber such as polyester, acrylic, vinylon or the like, and may be mixed with carbon fiber or Kepler fiber as required. The sealing ribbon tape 9 in turn is advantageously made of the same material as the plastic film 3.

The seam protection tape 8 is welded by melting the fiber constituting the same with a burner or the like. Alternatively, the seam protection tape 8 may be adhered to the plastic film 3 with a thermal adhesive such as polyamide-based one (nylon), ionomer, or the like.

Figure 7:
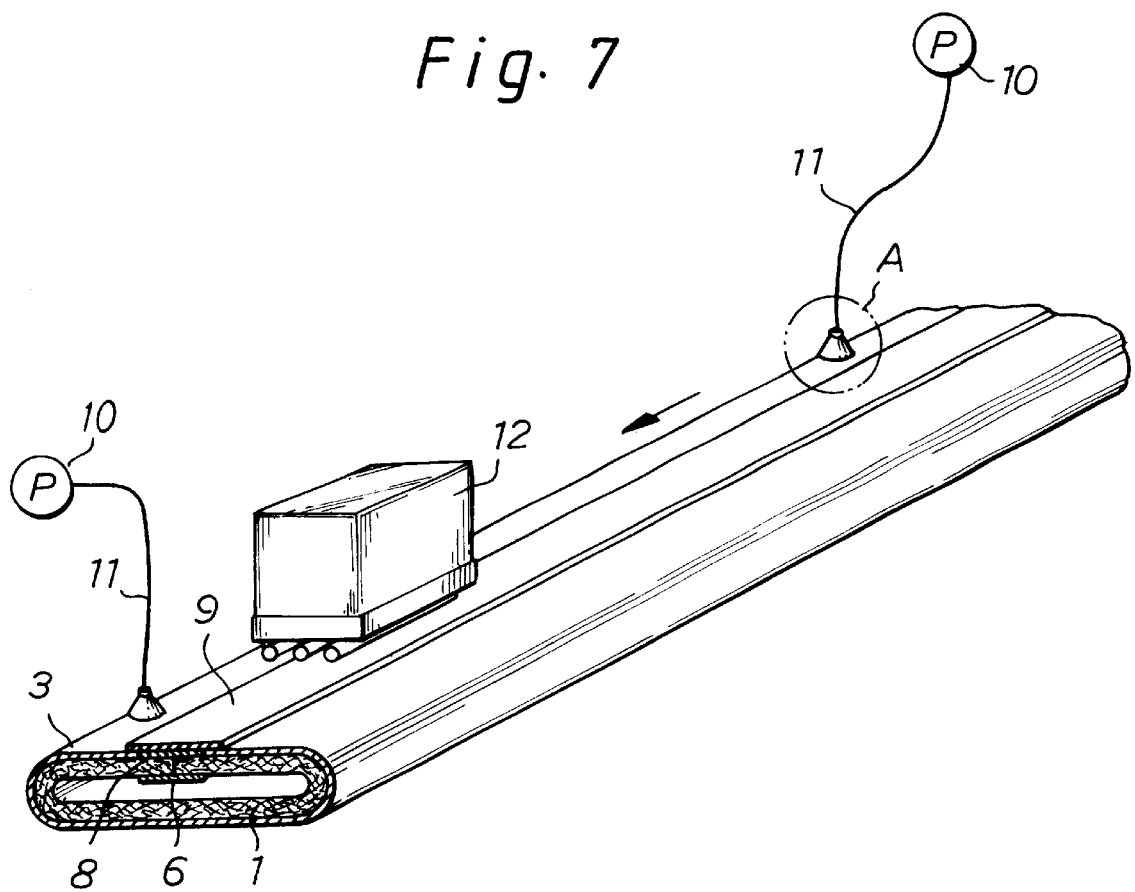
Figure 8:
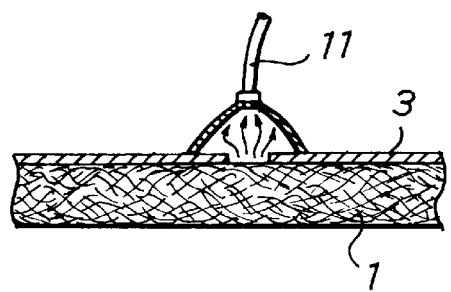
FIG. 8 is an enlarged partial view of the portion A shown in FIG. 7 for illustrating how the resin absorbent material 1 is evacuated.

The sealing ribbon tape 9 may be thermally welded by a method illustrated in FIGS. 7 and 8. Specifically, as illustrated in FIG. 7, the sealing ribbon tape 9 is placed on the seam of the tubular resin absorbent material 1 overlying the seam protection tape 8. Then, both edges the sealing ribbon tape 9 in the width direction are preliminary fixed on the plastic film 3 on both sides of the seam protection tape 8. Subsequently, a vacuum pump 10 is driven to evacuate the inside of the resin absorbent material 1. FIG. 8 illustrates how the resin absorbent material 1 is evacuated.

As the inside of the tubular resin absorbent material 1 is evacuated, the sealing ribbon tape 9 is closely contacted with the seam protection tape 8 and the plastic film 3. When the tubular resin absorbent material 1 is moved below a heater 12 in a direction indicated by an arrow FIG. 7 at a predetermined speed with the closely contacted state being maintained, the sealing ribbon tape 9, preliminary fixed on the outer surface of the resin absorbent material 1, is heated by the heater 12 and welded to the seam protection tape 8 and the plastic film 3, thereby providing an air-tight structure for the seam of the tubular resin absorbent material 1.

Figure 9:
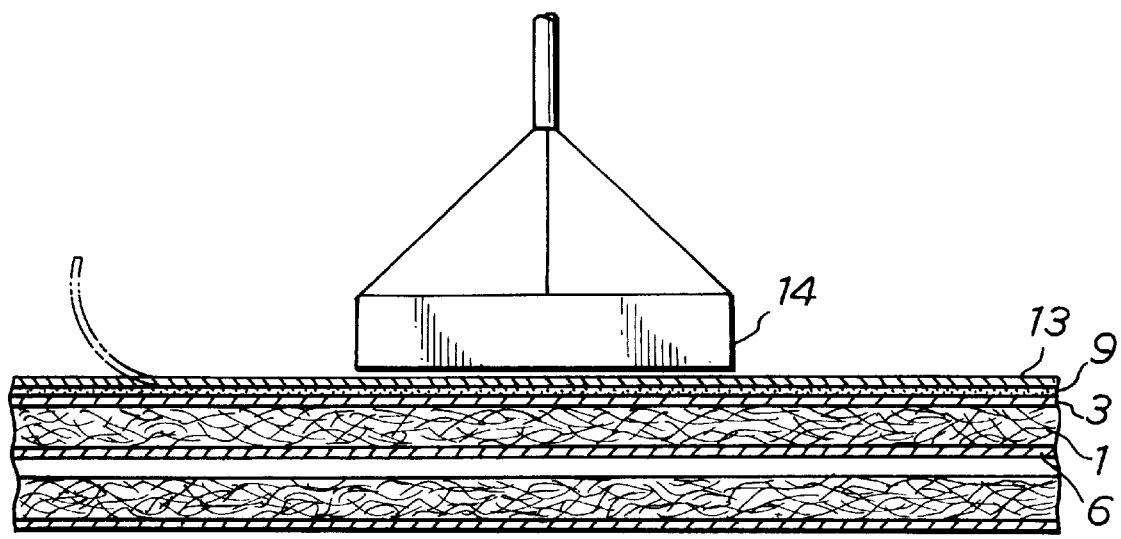
FIG. 9 is a partial cross-sectional view illustrating another embodiment of a method for welding a sealing ribbon tape onto a tubular resin absorbent material.
Figure 10:
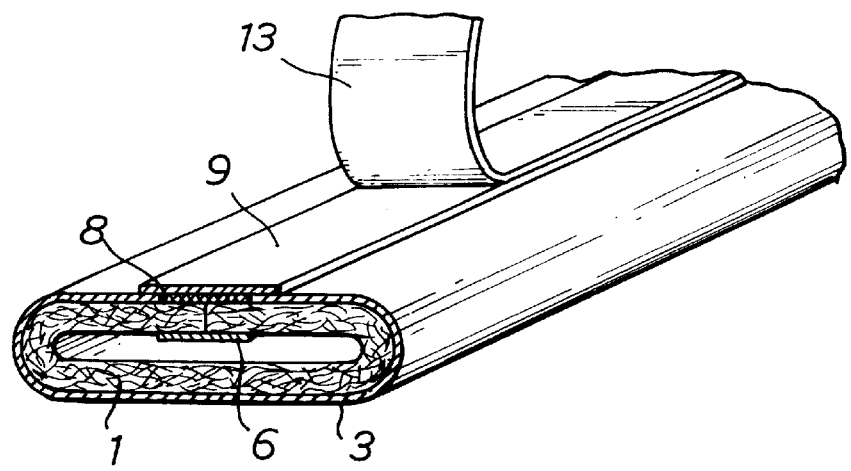
FIG. 10 is a partial perspective view of the tubular resin absorbent material having the sealing ribbon tape welded thereon by the method shown in FIG. 9.

Next, referring to FIGS. 9 and 10, an alternative method of welding the sealing ribbon tape 9 will be described below.

In accordance with the alternative method, a release member 13, which has a higher melting point than the sealing ribbon tape 9, is overlaid on the sealing ribbon tape 9. Then, the sealing ribbon tape 9 is heated with a press heater 14 through the release member 13 while applying a pressure onto the sealing ribbon tape 9 to the seam protection tape 8 and the plastic film 4. After cooling, the release member 13 is removed.

The release member 13 may be made of a material selected from paper, plastic film, fabric, and so on. Also, the release member 13 is made of a thin material, in consideration of its thermally conductive property, and has a width dimension equal to or slightly larger than that of the sealing ribbon tape 9.

The press heater 14 is urged with a fluid pressure or an electrical driving force, and heated with electric power, steatn, burner, or any other suitable means.

According to this method, since the release member 13 is interposed between the sealing ribbon tape 9 and the press heater 14, the sealing ribbon tape 9 is prevented from melting and sticking to the press heater 14. Thus, the sealing ribbon tape 9 can be pressed with a large force and heated with suffice by the press heater 14, thereby making it possible to carry out reliable sealing operations.

Next, with reference to FIGS. 11 to 13, alternative embodiments of the method of sealing the seam of the resin absorbent material 1 will be described hereunder.

Figure 11A:
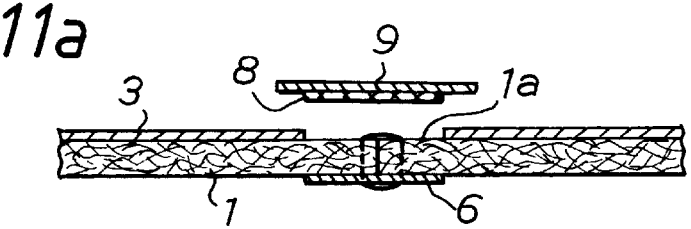
FIGS. 11A and 11B are partial cross-sectional views of a resin absorbent material for illustrating a first alternative embodiment of a method for sealing a seam of the resin absorbent material.
Figure 11B:
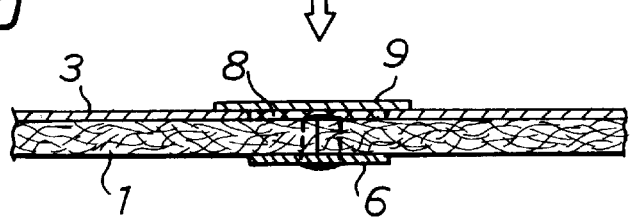

Referring first to FIGS. 11A, a first alternative method includes previously welding or adhering a sealing ribbon tape 9 having a width larger than that of a seam protection tape 8 to the surface of the seam protection tape 8. The seam protection tape 8 has a width identical to or slightly smaller than that of a sewing margin 1a (a portion not covered with a plastic film 3) of a resin absorbent material 1. Then, as illustrated in FIG. 11B, the sealing ribbon tape 9 is covered over the sewing margin 1a from the above such that the seam protection tape 8 is fitted into the sewing margin 1a. Both side portions of the sealing ribbon tape 9 extending from side edges of the seam protection tape 8 are welded or adhered to the plastic film 3 to air-tight seal the seam joint).

Figure 12A:
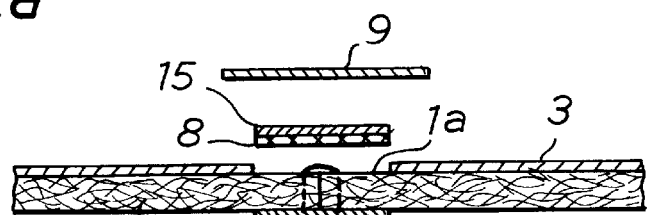
FIGS. 12A and 12B are partial cross-sectional views of a resin absorbent material for illustrating a second alternative embodiment of a method for sealing a seam of the resin absorbent material.
Figure 12B:
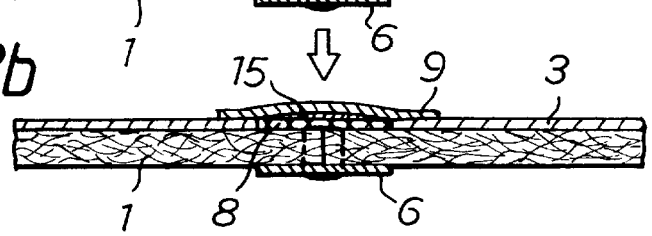

Referring next to FIG. 12A, a second alternative method includes previously welding or adhering a plastic ribbon tape 15 to one surface of a seam protection tape 8. The plastic ribbon tape 15 is made of the same material as and having the same width with a sealing ribbon tape (plastic film 3) 9 which in turn has a width identical or slightly smaller than that of a sewing margin 1a of a resin absorbent material 1. Next, as illustrated in FIG. 12B, the seam protection tape 8 and the plastic ribbon tape 15 are fitted into the sewing margin 1a of the resin absorbent material 1 from the above. Then, a sealing ribbon tape 9 having a larger width is disposed over a portion of the plastic film 3 with the seam protection tape 8 and the plastic ribbon tape 15 fitted in the sewing margin 1a under the sealing ribbon tape 9. Subsequently, the sealing ribbon tape 9 is welded or adhered to the plastic ribbon tape 15 and the plastic film 3, thereby air-tight sealing the seam Oiont).

Figure 13A:
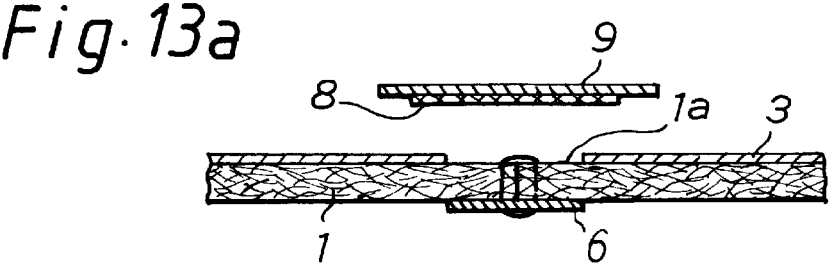
FIGS. 13A and 13B are partial cross-sectional views of a resin absorbent material for illustrating a third alternative embodiment of a method for sealing a seam of the resin absorbent material.
Figure 13B:
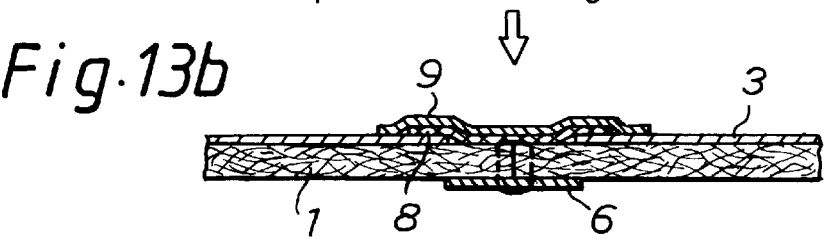

Referring next to FIG. 13A, a third alternative method includes previously welding or adhering a sealing ribbon tape 9 having a width larger than a seam protection tape 8 on the surface of the seam protection tape 8 which has a width larger than a sewing margin 1a of a resin absorbent material 1. Next, as illustrated in FIG. 13B, the sealing ribbon tape 9 and the seam protection tape 8 are overlaid on the sewing margin 1 a of the resin absorbent material 1 from the above. Then, both side portions of the seam protection tape 8 extending from the sewing margin 1a and both side portions of the sealing ribbon tape 9 extending from the seam protection 8 in lateral directions are welded or adhered to a plastic film 3 to air-tight seal the seam (joint).

Figure 6:
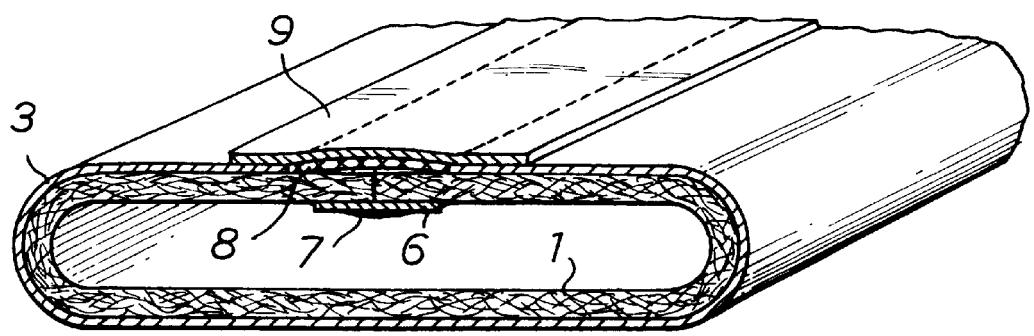

Consequently, when the tubular resin absorbent material 1 is provided with an air-tight structure for the seam or joint as illustrated in FIG. 6, the tubular resin absorbent material 1 is then impregnated with an unhardened liquid hardenable resin by an arbitrary method to complete a desired pipe liner bag which is utilized as a lining material for an old pipeline.

While the hardenable resin impregnated in the tubular resin absorbent material 1 is generally a thermosetting resin such as unsaturated polyester resin, an epoxy resin or the like, a light hardenable resin, a cold hardenable resin, and so on may be used instead.

In the method of manufacturing a pipe liner bag according to the present invention, the tubular resin absorbent material 1 is formed with the sewing margin 1a, not covered with the plastic film 3, on the outer surface thereof. The sewing yarn 7 appearing on the sewing margin 1a is protected by the seam protection tape 8 covering the same. The sealing ribbon tape 9 having a wider width is further overlaid on the seam protection 8, with both side portions of the sealing ribbon tape 9 extending from the side edges of the seam protection tape 8. The extending side portions are welded or adhered to the plastic film 3 to air-tight seal the seam, thereby making it possible to reliably seal the seam with simple operations without forming pin holes through the tubular resin absorbent material.

While the foregoing embodiments have been described for a pipe liner bag includes a single-layer resin absorbent material, a tubular resin absorbent material having a multi-layer structure may be used if the pipe liner bag is adjusted in thickness.

As will be apparent from the foregoing description on the present invention, seam can be reliably sealed with simple operations without forming pinholes through a tubular resin absorbent material.

While the present invention has been described in connection with its preferred embodiments, it is to be understood that various modifications will occur to those skilled in the art without departing from the spirit of the invention. The scope of the present invention is therefore to be determined solely by the appended claims.

What is claimed is:

1. A method of manufacturing a pipe liner bag comprising a tubular resin absorbent material having an outer surface covered with an air-tight plastic film and a hardenable resin impregnated in said tubular resin absorbent material, said method comprising the steps of:

affixing a plastic film on a surface of a strip-like resin absorbent material, said plastic film having a width smaller than said resin absorbent material to form sewing margins in both end portions in a width direction;

folding said resin absorbent material with said plastic film being exposed, and laying the sewing margins of said resin absorbent material on top of each other;

sewing the overlapping sewing margins of said resin absorbent material to form a tubular resin absorbent material;

affixing a seam protection tape to the sewing margins including a seam of said resin absorbent material; and affixing a sealing ribbon tape having a width larger than said seam protection tape over said seam protection tape to air-tight seal said seam.

2. A method of manufacturing a pipe liner bag according to claim 1, wherein said seam protection tape is unwoven fabric.

3. A method of manufacturing a pipe liner bag according to claim 1, wherein said sealing ribbon tape is made of a film of the same material as said plastic film.

4. A method of manufacturing a pipe liner bag according to claim 1, further comprising the steps of:

folding a reinforcing ribbon tape in a U-shape;

fitting said reinforcing ribbon tape into the overlapping sewing margines of said resin absorbent material and preliminary affixing said reinforcing ribbon tape therein; and sewing the overlapping sewing margins of said resin absorbent material together with said reinforcing ribbon tape.

5. A method of manufacturing a pipe liner bag according to claim 1, wherein said seam protection tape is previously affixed with said sealing ribbon tape.

6. A method of manufacturing a pipe liner bag according to claim 1, wherein said plastic film is formed in a multiple layer laminate including at least one of polyurethane, nylon and EVOH.

7. A method of manufacturing a pipe liner bag according to claim 1, further comprising the steps of:

placing a release member on said sealing ribbon tape, said release member having a melting point higher than said sealing ribbon tape;

heating said sealing ribbon tape with pressure through said release member to affix said sealing ribbon tape to said seam protection tape and said plastic film; and removing said release member.

8. A method of manufacturing a pipe liner bag according to claim 1, further comprising the steps of:

preliminarily affixing said sealing ribbon tape to a seam of said tubular resin absorbent material;

evacuating the inside of said tubular resin absorbent material; and heating the surface of said sealing ribbon tape to affix said sealing ribbon tape to said seam protection tape and said plastic film.

* * * * *